United States Patent Office 3,243,411
Patented Mar. 29, 1966

3,243,411
CROSS-LINKING FLUOROCARBON ELASTOMERS
Pliny O. Tawney, Passaic, and Robert P. Conger, Park Ridge, N.J., assignors to United States Rubber Company, New York, N.Y., a corporation of New Jersey
No Drawing. Filed Nov. 30, 1961, Ser. No. 156,166
12 Claims. (Cl. 260—61)

This invention relates to the curing, or cross-linking, of fluorocarbon elastomers, and more particularly it relates to a process of vulcanizing such elastomers by treating them with a novel organic curing agent, which is a chemical that ionizes in water to yield an organic entity having two or more negative charges with a basic strength greater than that of the acetoxy ion.

The fluorocarbon elastomers such as the elastomeric copolymers of vinylidene fluoride or nitrosotrifluoromethane with other fluorinated monomers such as chlorotrifluoroethylene or hexafluoropropene are highly useful for many purposes, but, unfortunately, more than a little difficulty has been experienced in providing satisfactory vulcanizing agents for these elastomers. It has been proposed to cure these copolymers with diamines, such as hexamethylenediamine carbamate (J. S. Rugg et al., Rubber Age., vol. 82, October 1957, p. 102) or triethylenediamine (Dixon et al., Ind. Eng. Chem., vol. 49, October 1957, p. 1687), or with monoamines, such as triethylamine or dimethylbenzylamine (R. G. Spain et al., "Development and Physical Testing of Elastomeric Compounds Resistant to Fuels at Elevated Temperatures," WADC Technical Report 55–492, part IV, February 1959, pp. 43 and 74), but the vulcanizates so obtained frequently give off unduly large quantities of gas upon heating, and also the vulcanizates seem to continue to cure during high temperature aging with the result that the properties change markedly. Similarly it has been proposed to cure these elastomers with inorganic hydroxides (Spain pp. 16, 18, 19, 79) or tetraalkylammonium hydroxides (Spain, pp. 12 and 58) as well as by modifying the elastomer with a secondary amine containing other functional groups and then subsequently cross-linking through these other functional groups (W. R. Griffin, "A Room Temperature Vulcanization System for Selected Fluorine Containing Polymers," WADC Technical Report 59–42, March 1959). Curing with organic peroxides, using metal oxides as accelerators, and with polyisocyanates, polyamines and isocyanate-amine combinations is also described by Conroy et al., Rubber Age, vol. 76, No. 4, January 1955, page 543, while Griffin et al. refer to still other curing agents in Rubber Age, 77 (4), 559, July 1955. In general such conventional cures of the fluorocarbon elastomers suffer from various disadvantages, such as inconvenience or inefficiency, or undesirable side effects or deficiences in the properties or behavior of the products.

Accordingly, the principal object of the present invention is to provide a new method of curing fluorocarbon elastomers.

The invention is based on the surprising discovery that fluorocarbon elastomers can be vulcanized in the presence of novel vulcanizing agents which are chemicals that ionize in water to yield an entity which has two or more negative charges with a basic strength greater than that of the acetoxy ion. Chemicals which function in this manner include the following, in order of decreasing preference:

(1) alkali metal salts of polyphenols.
(2) alkali metal salts of polythiols.
(3) alkali metal salts of mercaptophenols.
(4) alkali metal salts of mercaptoalkanols.
(5) alkali metal salts of polyalcohols.

Typical curing agents of the invention are the metal salts of dithiols, especially the alkali metal salts of alkanedithiols, aralkanedithiols and arenedithiols, such as the dipotassium salt of 1,9-nonanedithiol, other dipotassium salts of aliphatic dithiols, and disodium and dilithium salts of other alkanedithiols. The alkanedithiols can be obtained commercially, or prepared by one of several methods outlined in Beilstein's Handbuch der Organischen Chemie, especially the third supplement; Whittaker, Biochemical Journal (London), vol. 41, p. 57 (1947); U.S. Patents 2,230,390, F. K. Signaigo, Feb. 4, 1941; and 2,436,137, C. F. Biswell, Feb. 17, 1948. The salts can be prepared in water or water/alcohol solution by adding the proper alkali hydroxide, carbonate, bicarbonate, or even acetate to the dithiol. The aliphatic dithiols used may contain nitrogen, sulfur or oxygen atoms in the chains, e.g., $HS(CH_2)_nO(CH_2)_mSH$, etc., where $n$ and $m=1, 2, 3, 4$ or higher.

Other examples of curing agents of the invention are the salts of aralkanedithiols, e.g., the salts of 3,5-bis (mercaptomethyl)-2,4,6-trimethylphenol, salts of other mercaptomethyl and mercaptoethyl derivatives of aromatic compounds such as the dipotassium salt of p-xylene-alpha,alpha'-dithiol and the dipotassium salt of durene-3,6-di(ethanethiol), salts of dithiols prepared from the reaction products of bisphenols with ethylene oxides, such as the disodium salt of 4,4'-isopropylidenebis(2-phenoxyethanethiol), etc.

Further examples of curing agents of the invention are the salts or aromatic dithiols, e.g., salts of the three benzenedithiols, such as the potassium, lithium and sodium salts of 1,2-benzenedithiol, 1,3-benzenedithiol and 1,4-benzenedithiol; salts of the various napthalenedithiols such as the potassium and sodium salts of 1,2-naphthalenedithiol, 1,4-napthalenedithiol, 1,5-naphthalenedithiol and 1,8-naphthalenedithiol; salts of naphthalenetrithiols, such as the sodium salt of 1,4,5-naphthalenetrithiol; phenoxybenzenedithiols, such as the disodium salt of 4,4'-oxybis (benzenethiol); diphenylmethanedithiols, such as the disodium salt of 4,4'-diphenylmethanedithiol, etc. (many of these may be prepared by methods given in Organic Synthesis, vol. 33, p. 49 or Marvel and Caesan, J. Am. Chem. Soc., vol. 73, p. 1097 [1951]).

Additional examples of curing agents useful in the invention are esters containing two or more mercaptide groups, e.g., alkali metal salts of various glycol dimercaptoacetates such as ethyleneglycol bis(mercaptoacetate); 1,2-propyleneglycol bis(mercaptoacetate), glycerine tris(mercaptoacetate), etc.

Typical bisphenoxide curing agents are the dipotassium, disodium, and dilithium salts of various biphenols with the two aromatic rings joined, or separated by various groups, as exemplified by the formula:

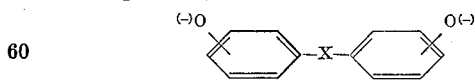

where X is a single bond (as in biphenyl compounds) or various divalent grouping, e.g., —$CH_2$— (as in diphenylmethane compounds)

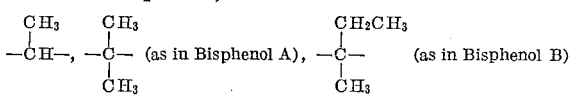

cyclohexylidene, —NHCH$_2$CH$_2$NH—, —S—

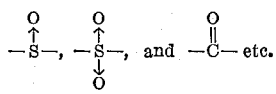 etc.

(Many of these compounds may be obtained from commercial sources.) Other examples are salts of naphthalenediols, anthracenediols, and the three phenylenediols (hydroquinone, resorcinol, and catechol).

Other examples are the salts of the substituted derivatives of the above bisphenols and arenediols. This substitution, for example, may be alkyl, halogen, nitro, cyano, etc., as in sodium salts of 2,2'-methylenebis(4-chlorophenol); 2,2'-methylenebis(4 - methylphenol); 4,4'-isopropylidenebis(2-chlorophenol); 2,2' - methylenebis-(4-nitrophenol); 2,2'-methylenebis(4 - ethoxycarbonylphenol) or 2,2'-methylenebis(4-cyanophenol).

Typical bisalkovide curing agents are the dipotassium, disodium and dilithium salts of alkanediols and arenebisalkanols. These may be prepared from the diols by several methods described briefly in Bielstein's Handbuch der Organischen Chemie and in the following references:

Vorländer, Liebigs Annalen der Chemie, vol. 280, p. 182 (1894).

Parone, Chemisches Zentralblatt, vol. 1905 II, p. 751.

Mamedov, Chemical Abstracts, vol. 35, p. 1381 (1941).

Dore and Doran, J. Chemical Society, vol. 1929, p. 2246.

Heilbron and Simpson, ibid, vol. 1932, p. 270.

Examples of salts of alkanediols are salts of ethylene glycol, propylene glycol, tetramethylene glycol, butanediol-1,3, 2-methylpropanediol-1,3, 2,2-dimethylpropanediol-1,3, hexamethylene glycol, etc.

Examples of suitable salt-forming arenebis(alkanols) are:

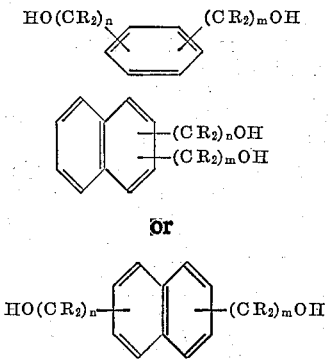

where $n$ and $m$ are 1, 2, 3, 4, etc. and R is H, CH$_3$, etc. or combinations of these and similar polynuclear compounds. Specific chemicals of this kind are the disodium salt of p-phenylenedimethanol; the disodium salt of p-phenylenediethanol; the disodium salt of 1,4-naphthalenedimethanol, and the disodium salt of 1,5-naphthalenedimethanol.

The substitution of other functional groupings in the diol molecule may be done. Furthermore, one chemical may combine in itself more than one of the operable types of groupings disclosed. Only a few of the many possible typical combinations of an alkoxide+phenoxide, an alkoxide+mercaptide, and a phenoxide+mercaptide grouping on the same molecule (or chemical compound) will be named here. These include

(as in the disodium salts of 2-mercaptoethanol, 4-mercapto-1-butanol, 12-mercapto-1-dodecanol)

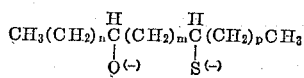

(as in the disodium salt of 3-mercapto-2-butanol and the disodium salt of 5-mercapto-2-hexanol)

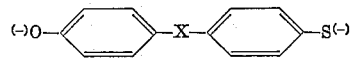

as in the disodiumsalt of 4-(4'-mercaptophenoxy)phenol

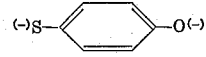

(as in the disodium salt of 4-mercaptophenol), where $n$, $m$ and $p$ are 0, 1, 2, 3, etc. and X is as defined above.

Illustrative species are listed as follows:
(1) dipotassium salt of Bisphenol A
(2) disodium salt of Bisphenol A
(3) dilithium salt of Bisphenol A
(4) dipotassium salt of Bisphenol B
(5) disodium salt of Bisphenol B
(6) dilithium salt of Bisphenol B
(7) dipotassium salt of p,p'-biphenol
(8) disodium salt of p,p'-biphenol
(9) dilithium salt of p,p'-biphenol
(10) dipotassium salt of 2,7-naphthalenediol
(11) disodium salt of 2,7-naphthalenediol
(12) dilithium salt of 2,7-naphthalenediol
(13) dipotassium salt of 1,5-naphthalenediol
(14) disodium salt of 1,5-naphthalenediol
(15) dilithium salt of 1,5-naphthalenediol
(16) dipotassium salt of 1,6-naphthalenediol
(17) disodium salt of 1,6-naphthalenediol
(18) dilithium salt of 1,6-naphthalenediol
(19) dipotassium salt of 4,4'-sulfonylbis(phenol)
(20) disodium salt of 4,4'-sulfonylbis(phenol)
(21) dilithium salt of 4,4'-sulfonylbis(phenol)
(22) dipotassium salt of 4,4'-carbonylbis(phenol)
(23) disodium salt of 4,4'-carbonylbis(phenol)
(24) dilithium salt of 4,4'-carbonylbis(phenol)
(25) dipotassium salt of 4,4'-bis(2-methylphenol)
(26) disodium salt of 4,4'-bis(2-methylphenol)
(27) dilithium salt of 4,4'-bis(2-methylphenol)
(28) dipotassium salt of 4,4'-isopropylidenebis(2-isopropylphenol)
(29) disodium salt of 4,4'-isopropylidenebis(2-isopropylphenol)
(30) dilithium salt of 4,4'-isopropylidenebis(2-isopropylphenol)
(31) dipotassium salt of 1,9-nonanedithiol
(32) disodium salt of 1,9-nonanedithiol
(33) dilithium salt of 1,9-nonanedithiol
(34) dipotassium salt of 3,5-bis(mercaptomethyl)-2,4,6-trimethylphenol)
(35) disodium salt of 3,5-bis(mercaptomethyl)-2,4,6-trimethylphenol)
(36) dilithium salt of 3,5-bis(mercaptomethyl)-2,4,6-trimethylphenol)
(37) dipotassium salt of 2,2'-thiodiethanethiol
(38) disodium salt of 2,2'-thiodiethanethiol
(39) dilithium salt of 2,2'-thiodiethanethiol
(40) dipotassium salt of 1,5-naphthalenedithiol
(41) disodium salt of 1,5-naphthalenedithiol
(42) dilithium salt of 1,5-naphthalenedithiol
(43) dipotassium salt of 1,6-naphthalenedithiol
(44) disodium salt of 1,6-naphthalenedithiol
(45) dilithium salt of 1,6-naphthalenedithiol
(46) dipotassium salt of 2,7-naphthalenedithiol
(47) disodium salt of 2,7-naphthalenedithiol
(48) dilithium salt of 2,7-naphthalenedithiol
(49) dipotassium salt of 2,2'-oxydiethanethiol
(50) disodium salt of 2,2'-oxydiethanethiol
(51) dilithium salt of 2,2'-oxydiethanethiol
(52) dipotassium salt of 2-mercaptoethanol
(53) disodium salt of 2-mercaptoethanol
(54) dilithium salt of 2-mercaptoethanol
(55) dipotassium salt of 4-mercaptophenol

(56) disodium salt of 4-mercaptophenol
(57) dilithium salt of 4-mercaptophenol
(58) dipotassium salt of 1,4-butanediol
(59) disodium salt of 1,4-butanediol
(60) dilithium salt of 1,4-butanediol
(61) dipotassium salt of ethylene glycol
(62) disodium salt of ethylene glycol
(63) dilithium salt of ethylene glycol The fluorocarbon elastomers to which the invention applies constitute a well known class of materials. They are substantially saturated, linear, high molecular weight, rubbery materials. They are highly fluorinated polymers of fluorinated compounds. The fluorinated compounds may contain other substituents besides fluorine, such as hydrogen, chlorine, bromine and nitroso. As indicated previously, such polymers include the elastomeric copolymers of vinylidene fluoride or of nitrosotrifluoromethane with other fluorinated monomers such as chlorotrifluoroethylene or hexafluoropropene. For example, Honn et al. U.S. Patent 2,833,752, May 6, 1958 column 3, lines 36–55, list $CF_2=CHCl$, $CF_2=CClF$, $CF_2=CCl_2$, $CF_3—CH=CF_2$, $CF_2=CHCl$, $$CF_3—CCl=CCl—CH_3$$

$CF_2=CHF$, $CF_3—CH=CH—CF_3$, $CF_2=CH_2$, $$CF_2=C—(CH_3)_2$$

$CF_2=CFBr$, $CF_2=CCl—CF_3$, $CF_3—CH=CH_2$ and $CF_3—CCl=CCl_2$ as highly fluorinated mono-olefins which may be copolymerized with the hydrogen-containing mono-olefins $CF_2=CH_2$, $CHF=CH_2$, $CH_2=CH_2$, $CFCl=CH_2$, $CCl_2=CH_2$, $CHCl=CH_2$, $CHBr=CH_2$ and $CH_2=C—(CF_3)CH_3$ to give rubbery high polymers.

Other examples of materials vulcanizable by the instant invention include the terpolymers of vinylidene fluoride, vinyl chloride and chlorotrifluoroethylene described by Honn et al., U.S. Patent 2,915,506, December 1, 1959; and the copolymers of trifluoronitrosomethane with $CF_2=CF_2$, $CH_2=CF_2$, $CF_2=CHCl$, $CF_2=CCl_2$, $$C_6H_5CH=CH_2$$

$CH_2=C—(CH_3)CO_2C_4H_9$ and $CF_2=CHF$ described by Crawford, Chem. & Eng. News, April 18, 1960, page 107.

In the practice of the invention the preferred fluorocarbon elastomers are those derived at least in part from organic fluoro compounds containing a substituent selected from hydrogen and nitroso.

To cure the fluorocarbon elastomer in accordance with the invention, one or more of the described curing agents are admixed with the elastomer. Typically the curing chemical is prepared beforehand, but it is also in many cases possible to prepare the vulcanizing agent in situ within the elastomer, particularly if the elastomer is being cured in solution, as will be illustrated in the working examples below. In many instances the action of the present novel curatives is so rapid that no heat need be applied and the cure proceeds at room temperature (e.g., 70° F. or even lower). In other cases the curing reaction is slower, and elevated temperatures (e.g., 300–400° F.) may have to be applied. In many cases it is preferred to carry out the cure at a temperature of from 150° F. to 350° F. Since there are many inter-related variables involved, including the solubility of the curative in the particular elastomer, the degree of ionization of the chemical, the presence or absence of steric hinderance effects, the "natural" acidity of the particular fluorocarbon rubber, the presence or absence of other compounding ingredients, the degree of cure desired, the size of the article being cured, the conditions of cure, and the nature of the heating device, it is difficult to state the amount of curing agent that will be suitable in a given case. The amount to be used depends, as indicated, on many factors including the following: (1) which fluorocarbon elastomer is used, (2) its reactivity, (3) its molecular weight, (4) its stiffness due to secondary bonding forces, (5) the amount and kind of reinforcing filler present, (6) the acidity or basicity of the rubber masterbatch, (7) the degree of cure desired or the blend of physical properties desired, (8) the particular curing agent used, etc. The proportions of curing agent to 100 parts of fluorocarbon rubber can frequently be varied from 0.1 phr. ("phr." stands for parts by weight per 100 parts by weight of elastomer) for very lightly crosslinked products to 50 phr. for very tightly crosslinked products of the hard rubber type. The preferred proportions for useful rubbery products will usually be 2 to 20 phr. depending on the above considerations.

Similarly, the time required for a given cure will vary widely in practice, from virtually instantaneous cure to slow cure requiring a day or more; the time and temperature of cure are usually inversely related, as are the time of cure and amount of curing agent. Ordinarily the cure can be accomplished in a period of from 5 minutes to 24 hours. Frequently a cure time of from about ½ hour to 4 hours is preferred.

As intimated previously, the fluorocarbon rubber tends to have a greater or lesser amount of native acidity. In the practice of this invention such acidity is neutralized either by using an excess of the curing agent, which is basic in nature, and/or by including some other basic material such as magnesium oxide, or the furnace type of carbon black which is basic in reaction. The curing agent is much more effective when the acidity of the polymer is thus neutralized.

In general, the novel curing system of the invention enables the fluorocarbon elastomer to be cured to a desired degree under much less drastic conditions than were required with previously known curing systems. Thus, in addition to their present uses, these fluorocarbon elastomers may now be used—thanks to the curing system of the invention—in production where the long post-cures of the conventional crosslinking agent would ruin the product, e.g., coated fabrics, etc. There is relatively little or no tendency to evolve hydrogen fluoride gas during the present cure, whereas there is a strong tendency to do so with the typical prior art cures, with the result that the prior cures tended to result in undesirable porosity or voids in the product. The products cured by the present method do not tend to continue to cure during high temperature aging, but remain stable.

Expanded products can be made by compounding with a blowing agent prior to cure.

Among the commercially available fluorocarbon elastomers useful in the invention may be mentioned Viton A, Viton A–HV, Viton B, Kel-F 2140 and Fuorel which are copolymers of vinylidene fluoride and perfluoropropene; Kel-F 3700 and Kel-F 5500 which are copolymers of vinylidene fluoride and chlorotrifluoroethylene.

The following examples, in which all parts are expressed by weight unless otherwise stated, will serve to illustrate the practice of the invention in more detail:

*Example 1*

This example illustrates the crosslinking of Viton A–HV (copolymer of vinylidene fluoride and perfluoropropene in mole ratio of 4:1) in solution by a bismercaptide formed previously or in situ.

(1A) To 12.5 g. of Viton A–HV dissolved in 250 ml. of 2-butanone was added 6.08 g. of potassium acetate dissolved in 100 ml. of 95% ethanol.

(1B) To solution 1A was added 5.76 g. of 1,9-nonanedithiol, which reacts with the potassium acetate to form in solution the nonanebismercaptide. This solution was then heated for 1¼ hours at 75° C., whereby it became a tightly gelled, i.e., the rubber separated as a solvent swollen mass. It was vacuum dried at room temperature. The dry rubbery residue does not redissolve in the solvent, 2-butanone, even on heating to 70° C. A portion was purified by extraction with methanol to remove unreacted mercaptan. The resultant polymer contained 6.80% sulfur. This corresponds to about 65% of the bis-mercaptide having reacted with the Viton A–HV.

(1C) The dipotassium salt of 3,5-bis(mercaptomethyl)-2,4,6-trimethylphenol (BMTMP), was prepared by adding 2.28 g. of BMTMP and 2.03 g. of potassium acetate to 100 ml. of 95% ethanol. To the resulting solution of bismercaptide was added a solution of 12.5 g. of Viton A–HV in 250 ml. of 2-butanone. The resulting yellowish solution was then heated for 1 hour at 75° C., whereby it became crosslinked as evidenced by its separation as a solvent swollen mass which, after vacuum drying at room temperature, would not redissolve in 2-butanone, even on heating at 70° C. A portion was purified as in 1B and contained 3.32% sulfur.

*Example 2*

This example illustrates the curing of a black masterbatch of Viton A–HV by the dipotassium salt of BMTMP (see Example 1C). The composition was the following:

| | Parts |
|---|---|
| Viton A–HV | 100 |
| Carbon black | 20 |
| Magnesium oxide | 5 |
| BMTMP | 19.8 |
| Potassium acetate | 6.1 |

A film was formed from a dispersion of this composition in a 2-butanone/ethanol mixture. The dried film was heated in the oven for 60 minutes at 320° F. The heated film would swell with retention of shape but was insoluble in 2-butanone, showing that it was crosslinked (cured).

*Example 3*

This example illustrates the curing of Viton A–HV in solution using a bisphenoxide (namely the disodium salt of Bisphenol A [4,4'-isopropylidenebisphenol]). To a solution of 12.5 g. of Viton A–HV in 125 ml. of 2-butanone at room temperature was added a slurry of the disodium salt of Bisphenol A in ethanol, prepared by reaction of 1.2 g. of sodium hydroxide in 20 ml. of ethanol with 3.42 g. of Bisphenol A. As soon as some of the solid had dissolved in the Viton A–HV cement, the solution became gelled. A portion was dried and was found to have a swelling index in 2-butanone of 17.8, with 10% being soluble. Therefore, it was crosslinked by the disodium salt of Bisphenol A.

*Example 4*

This example illustrates the curing of black-filled Viton A–HV by a bisphenoxide (the disodium salt of Bisphenol A). A black-filled Viton A–HV master-batch was prepared using the recipe given below. To this was added varying amounts of the disodium salt of Bisphenol A (prepared from 6.84 g. of Bisphenol A and 2.40 g. of sodium hydroxide in ethanol) on a mill with the stock temperature being kept below 220° F. Samples were cured in the press for 60' at 325° F. Stock 4A, which is in contrast with those (4B, 4C, 4D) which illustrate our invention, was processed and tested like the others except it contained no bisphenoxide curing agent.

| Stock Code | 4A | 4B | 4C | 4D |
|---|---|---|---|---|
| Viton A–HV | 100 | 100 | 100 | 100 |
| Philblack A | 20 | 20 | 20 | 20 |
| Magnesium oxide | 5 | 5 | 5 | 5 |
| Disodium Bisphenol A | | 2.42 | 7.26 | 12.10 |
| Cured 60' at 325° F. in a press | | | | |
| Scott Tensile at R.T.,[1] p.s.i. | ([2]) | 414 | 2,260 | 2,080 |
| Elongation at Break at R.T., percent | | 810 | 275 | 240 |
| Modulus at 200% Elongation at R.T., p.s.i. | | 200 | 1,350 | 1,575 |
| Scott Tensile at 300° F., p.s.i. | | 34 | 375 | 450 |
| Elongation at Break at 300° F., percent | | 27 | 140 | 140 |
| Durometer at R.T. | | 60 | 68 | 74 |

[1] Room temperature.
[2] Not cured.

This example shows that (1) without our new curing agent (Example 4A) the Viton A–HV masterbatch is essentially uncured, (2) a cure is obtained with as little as 2.42 phr. (parts per hundred of rubber), and (3) certain physical properties of the vulcanized sample can be regulated by varying the amount of our new curing agent used—the upper limit of amount of chemical used being determined by the certain physical property (if it is in the range obtainable) desired in the end product. For example, the modulus at 200% elongation at R.T. of this masterbatch can be varied from 200 p.s.i. to 1575 p.s.i. by using from 2.42 to 12.10 phr. of the disodium salt of Bisphenol A.

*Example 5*

This example illustrates the use of several inorganic chemicals which are of sufficient basic strength to crosslink Viton A–HV. For stock 5A, a solution of 0.001 formula weight of sodium monosulfide .9H$_2$O in ethanol was added to a 20% total solids cement of gum Viton A–HV in 2-butanone. For stock 5B, the inorganic chemical, sodium carbonate, was added to Viton on a two-roll mill and the mixture thereafter made into a 20% total solids solution in 2-butanone. The following table shows proportions of ingredients and conditions of cure.

| Stock Code | 5A | 5B |
|---|---|---|
| Viton A–HV (in a 20% TS cement), grams | 4 | 10 |
| Carbon black, grams | | 2.0 |
| MgO, gram | | 0.5 |
| Sodium carbonate, gram | | 0.53 |
| Sodium monosulfide .9H$_2$O, gram | .24 | |
| Ethanol, grams | 1.76 | |
| Hours to gel | 4–16 | ([1]) |

[1] A film was cured (not soluble in 2-butanone) after 2 hours at 260° F.

*Example 6*

This example illustrates the use of several bisphenoxides as crosslinking agents for Viton A–HV. A solution of 0.001 mole of the bisphenoxide in alcohol was adde to 4 g. of Viton A–HV in 16 g. of 2-butanone. The table below gives the time in which gelation (crosslinking) occurred at 70 C.

| Stock Code | 6A | 6B | 6C | 6D | 6E | 6F | 6G |
|---|---|---|---|---|---|---|---|
| Viton A–HV, grams | 4.0 | 4.0 | 4.0 | 4.0 | 4.0 | 4.0 | 4.0 |
| Dilithium salt of Bisphenol A, gram | .206 | | | | | | |
| Dipotassium salt of— | | | | | | | |
| Bisphenol A, gram | | .27 | | | | | |
| p,p'biphenol, gram | | | .228 | | | | |
| 4,4'-dihydroxy-3,3'-dimethylbiphenyl, gram | | | | .256 | | | |
| 1,1-bis(p-hydroxyphenyl)cyclohexane, gram | | | | | .31 | | |
| Bisphenol B, gram | | | | | | .284 | |
| 4,4'-isopropylidene-bis (2-isopropylphenol), gram | | | | | | | .354 |
| Hours to gel | 0 | 0 | 0 | 0 | 0 | 0 | 0 |

| Stock Code | 6H | 6I | 6J | 6K | 6L | 6M | 6N | 6O |
|---|---|---|---|---|---|---|---|---|
| Viton A-HV, grams | 4.0 | 4.0 | 4.0 | 4.0 | 4.0 | 4.0 | 4.0 | 4.0 |
| 2,7-naphthalenediol, gram | .202 | | | | | | | |
| 1,6-naphthalenediol, gram | | .202 | | | | | | |
| 1,5-naphthalenediol, gram | | | .202 | | | | | |
| N,N'-ethylenediaminodi (o-cresol), gram | | | | .314 | | | | |
| 4,4'-sulfonylbis-(phenol), gram | | | | | .276 | | | |
| 4,4'-carbonylbis-(phenol), gram | | | | | | .256 | | |
| Potassium hydroxide (0.002 mole), gram | | | | | | | .112 | |
| Lithium hydroxide (0.002 mole), gram | | | | | | | | .084 |
| Hours to gel | 0 | 0 | 0 | 0 | 4-16 | 4-16 | No gel | No gel |

All stocks were heated to 70° C. Stocks 6A to 6K inclusive gelled immediately. Stocks 6L and 6M gelled after 4 to 16 hours and stocks 6N and 6O did not gel during the period of the test.

*Example 7*

This example demonstrates the vulcanization of Viton A by the disodium salts of alkylene glycols.

The following solutions were prepared:

*Solution A.*—A solution of 20 grams of Viton A (copolymer of vinylidene fluoride and perfluoropropene in mole ratio of 4:1) in 80 ml. of tetrahydrofuran.

*Solution B.*—A solution of the disodium salt of ethylene glycol, obtained by adding 0.5 g. (0.022 mole) of sodium metal to a solution of 0.62 g. (0.01 mole) of ethylene glycol in 10 ml. of isopropanol.

*Solution C.*—A solution of the disodium salt of tetramethylene glycol, obtained by addition of 0.5 of sodium metal to a solution of 0.9 g. (0.01 mole) of tetramethylene glycol in 10 ml. of isopropanol.

*Solution D.*—A solution of sodium ethoxide in ethanol, prepared by adding 0.5 g. of metallic sodium to 15 ml. of ethanol.

*Solution E.*—A solution of sodium isopropoxide in isopropanol, prepared by adding 0.5 g. of sodium metal to 15 ml. isopropanol.

To 15 cc. of solution A were added 5 ml. of isopropanol and 2 ml. of solution B. The rapidly stirred mixture immediately darkened to an amber color and gelled tightly at room temperature, i.e., separated as a solvent swollen mass, which, after vacuum drying at room temperature, would not redissolve in the solvent. This shows that the disodium salt of ethylene glycol has vulcanized the Viton A.

To 15 cc. of solution A were added 2 ml. of solution C. The rapidly stirred solution immediately became amber-colored and gelled tightly at room temperature, i.e., separated as a solvent swollen mass, which, after vacuum drying at room temperature to a solid rubber, would not redissolve in 2-butanone. This shows that the disodium salt of tetramethylene glycol vulcanizes Viton A.

To 15 cc. of solution A were added 5 ml. of isopropanol and 2 ml. of solution D. The solution immediately turned amber and less viscous. No gelation occurred even when the solution was heated to reflux for 5 minutes. This shows that sodium ethoxide does not cure Viton A.

To 15 cc. of solution A were added 5 ml. of isopropanol and 2 ml. of solution E. The solution turned yellow at room temperature but did not gel even when heated to reflux for 5 minutes. This shows that sodium isopropoxide does not vulcanize Viton A.

*Example 8*

This example illustrates the use of a mixed mercaptidealkoxide as a crosslinking agent for fluorocarbon elastomers. A solution of 0.002 gram-mole of the disodium salt of 2-mercaptoethanol in isopropanol was added to 4 g. of Viton A in 16 g. of dioxan containing 4 g. of isopropanol. The solution immediately became light amber in color but it did not gel when heated for 3 minutes at 88° C. A portion was poured onto a glass plate, the solvent was evaporated, and the film was heated for 3 hrs. at 330° F. It thereby became tightly crosslinked as shown by insolubility in dioxan and in 2-butanone. A blank run under the same conditions but containing no added salt immediately dissolved in dioxan or in 2-butanone.

*Example 9*

This example illustrates the use of a mixed mercaptidephenoxide as a crosslinking agent for fluorocarbon elastomers. A solution of 0.02 mole of the dipotassium salt of 4-mercaptophenol in isopropanol was added to 4 g. of Viton A in 16 g. of dioxan containing 4 g. of isopropanol. The solution became light amber in a short time but it did not gel when heated for 3 minutes at 88° C. A portion was poured onto a glass plate, and the solvent was evaporated. When the film was heated for 3 hrs. at 330° F., it became tightly crosslinked, as shown by the small degree of swelling and its insolubility in 2-butanone. A blank run under the same conditions, but containing no added salt, readily dissolved in the 2-butanone.

Having thus described our invention, what we claim and desire to protect by Letters Patent is:

1. A method of curing a fluorocarbon elastomer which is a substantially saturated, linear, rubbery polymer of a fluorinated carbon compound wherein any substituents of said compound other than fluorine are selected from the group consisting of hydrogen, chlorine, bromine and nitroso, comprising mixing 100 parts by weight of said elastomer with from 0.1 to 50 parts by weight of a chemical that ionizes in water to yield an organic entity having two or more negative charges with a basic strength greater than that of the acetoxy ion and is an alkali metal salt of an organic diol, and subjecting the resulting mixture to vulcanizing conditions.

2. A method of curing an elastomer which is a copolymer of a monomer selected from the group consisting of vinylidene fluoride and nitrosotrifluoromethane with a monomer selected from the group consisting of chlorotrifluoroethylene and hexafluoropropene, which comprises mixing 100 parts by weight of said elastomer with from 0.1 to 50 parts by weight of an alkali metal salt of an organic diol, and subjecting the resulting mixture to a temperature of 70°–400° F. for a period of from 5 minutes to 24 hours.

3. A method of curing an elastomeric copolymer of vinylidene fluoride and perfluoropropene comprising heating 100 parts by weight of said copolymer with from 2 to 20 parts by weight of an alkali metal salt of a bisphenol at a temperature of 150–350° F. for a period of ½–4 hours.

4. A method of curing an elastomeric copolymer of vinylidene fluoride and perfluoropropene comprising heating 100 parts by weight of said copolymer with from 2 to 20 parts by weight of an alkali metal salt of a glycol at a temperature of 150–350° F. for a period of ½–4 hours.

5. A method of curing an elastomeric copolymer of vinylidene fluoride and perfluoropropene comprising heating 100 parts by weight of said copolymer with from 2 to 20 parts by weight of the dipotassium salt of Bisphenol A at a temperature of 150–350° F. for a period of ½–4 hours.

6. A method of curing an elastomeric copolymer of vinylidene fluoride and perfluoropropene comprising heating 100 parts by weight of said copolymer with from 2 to 20 parts by weight of the disodium salt of Bisphenol A at a temperature of 150–350° F. for a period of ½–4 hours.

7. A fluorocarbon elastomer which is a substantially saturated, linear, rubbery polymer of a fluorinated carbon compound wherein any substituents of said compound other than fluorine are selected from the group consisting of hydrogen, chlorine, bromine and nitroso, cured with from 0.1 to 50 parts by weight, per 100 parts by weight of said elastomer, of a chemical that ionizes in water to yield an organic entity having two or more negative charges with a basic strength greater than that of the acetoxy ion and is an alkali metal salt of an organic diol.

8. An elastomer which is a copolymer of a monomer selected from the group consisting of vinylidene fluoride and nitrosotrifluoromethane with a monomer selected from the group consisting of chlorotrifluoroethylene and hexafluoropropene, cured with from 0.1 to 50 parts by weight, per 100 parts by weight of said elastomer, of an alkali metal salt of an organic diol.

9. An elatsomeric copolymer of vinylidene fluoride and perfluoropropene cured with from 2 to 20 parts by weight, per 100 parts by weight of said elastomer, of an alkali metal salt of a bisphenol.

10. An elastomeric copolymer of vinylidene fluoride and perfluoropropene cured with from 2 to 20 parts by weight, per 100 parts by weight of said elastomer, of an alkali metal salt of a glycol.

11. An elastomeric copolymer of vinylidene fluoride and perfluoropropene cured with from 2 to 20 parts by weight, per 100 parts by weight of said elastomer, of the dipotassium salt of Bisphenol A.

12. An elastomeric copolymer of vinylidene fluoride and perfluoropropene cured with from 2 to 20 parts by weight, per 100 parts by weight of said elastomer, of the disodium salt of Bisphenol A.

References Cited by the Examiner

UNITED STATES PATENTS

| | | | |
|---|---|---|---|
| 2,598,407 | 5/1952 | Marvel | 260—79.5 XR |
| 2,649,431 | 8/1953 | Little | 260—41.5 |
| 3,008,916 | 11/1961 | Smith | 260—79.5 XR |
| 3,041,304 | 6/1962 | Gardner | 260—79.5 XR |

OTHER REFERENCES

Smith, Rubber World, vol. 140, pp. 263–266 (May 1959).

WILLIAM H. SHORT, *Primary Examiner.*

JOSEPH R. LIBERMAN, *Examiner.*

J. C. MARTIN, *Assistant Examiner.*